Aug. 18, 1959　　　C. T. COX　　　2,899,740
BRAKE MATERIAL FOR EXTREME HEAVY DUTY
Filed Aug. 30, 1957

12 — SINTERED MIXTURE OF FINE IRON, COARSE GRAPHITE AND SILICON CARBIDE

INVENTOR.
C. THOMAS COX
BY Richard H. MacCutcheon
ATTORNEY

United States Patent Office 2,899,740
Patented Aug. 18, 1959

2,899,740

BRAKE MATERIAL FOR EXTREME HEAVY DUTY

Cecil Thomas Cox, Pepper Pike, Ohio, assignor to The S. K. Wellman Company, Bedford, Ohio, a corporation of Ohio Application August 30, 1957, Serial No. 681,192

3 Claims. (Cl. 29—182.8)

The present invention relates to improvement in friction material for extremely heavy duty brakes, for example, for controlling rotational movement and dissipating a large amount of heat energy in a short time as required in the case of landing wheel brakes for airplanes of large size. For such use there are severe restrictions of space and weight in addition to the basic requirement of large heat load capacity.

By way of example, it may be pointed out that a large commercial plane such as a Douglas DC–7–C requires some 9,100,000 ft. lbs. of energy for a normal stop, and a jet tanker such as the Boeing KC–135 requires 13,500,000 ft. lbs. of energy for a normal stop, and of course, even much greater energies are required for a so-called high energy stop or a rejected take-off (i.e. "panic" stop). Friction material used for linings or facings in aircraft brakes, must be selected and compounded with many factors in mind if customer acceptance and satisfactory operation are to be assured. These factors include (1) ability to meet customer's specification as to so many normal energy stops, so many high energy stops, or one "panic" stop, (2) low wear of the lining and the surface which it engages, (3) high coefficient of friction requirement and requisite absence of "fading," (4) low "torque peaking" as hereafter described, (5) quietness of operation of the material, (6) freedom from "grabbing" and erratic operation.

Further difficulties arise in that the operational temperatures are so high, being in the range of 1600° for normal stop and 2400° for an emergency stop, temperatures at which some materials completely disassociate.

Particularly for application in brakes for large aircraft, there has been a long search for a satisfactory friction material with low torque peaking, low wear rate and minimum failure at high temperatures due to disintegration and decomposition of the material used.

It is an object of the present invention to provide simple and inexpensive means for overcoming the above mentioned difficulties.

Another object of the invention is to provide an improved friction brake lining material capable of meeting the most severe working conditions and requirements, including those on large airplanes as mentioned above, and having good durability.

Other objects of the invention ancillary to those first noted include the provision of a friction composition product for arrangement in small space, though of high efficiency and uniform action and with practical means for dissipating frictionally generated heat in large quantity.

In broad aspect my invention comprises a novel friction material particularly useful for aircraft brakes, and comprising a mixture sintered and bonded and having a base of an originally finely divided powdered iron, together with graphite and silicon carbide of substantial proportions and of relative coarseness. Coarseness of the graphite is believed of particular importance, the silicon carbide is also desirably coarser than the iron powder, and the use of this "abrasive" is possibly permissible because as it gets hot it gets softer (and less like a cutting tool) but at any rate, whatever the theory, the use of the mix of the invention has been found to result in a very good and lasting bond with a requisite solid metal backing (as hereafter described), very adequate heat transfer, low wear, minimal torque peaking, and what could easily be termed phenomenal results from the standpoint of meeting all operational requirements as above detailed.

Other objects and advantages will become apparent and the invention may be better understood from consideration of the following description and the accompanying drawing, in which.

Figure 1:
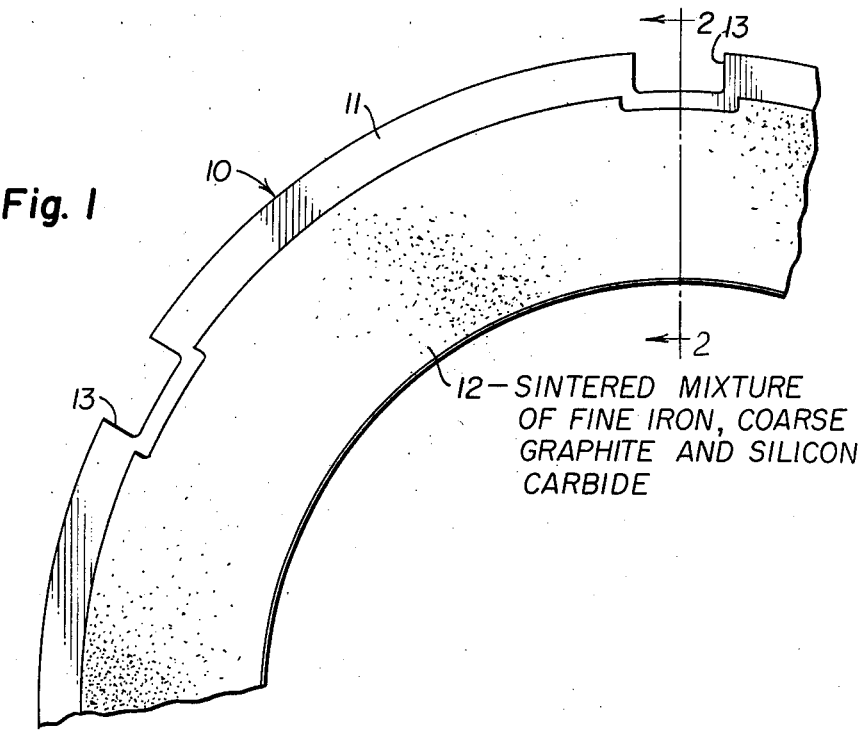
Fig. 1 is a fragmentary axial section of a rotary composite friction disc for an aircraft brake.
Figure 2:
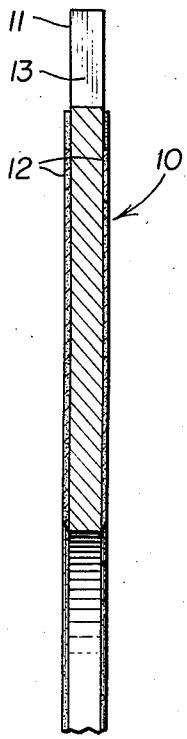
Fig. 2 is a radial sectional view taken along the line 2—2 of Fig. 1.

A disc as shown in Figs. 1 and 2 could be either stationary or rotatable, but for purposes of description will be assumed rotatable for co-operation with discs (not shown) anchored with respect to non-rotatable structure. In manner too well known to the art to require description, there will then be a plurality of annular friction discs anchored alternately to rotatable and non-rotatable structures, with means for pressing the discs axially together to frictionally resist turning of the rotational structure. In practice, one of the sets of discs is of solid metal (the non-rotating discs for the assumed embodiment) and discs of the other set are provided with friction facing comprising either an organic material such as asbestos or a sintered powdered mixture of metals and non-metals.

Sintered articles of the type referred to are produced by pressing or briquetting powders of suitable composition, usually comprising metals predominately and containing minor amounts of non-metallic ingredients such as graphite.

The briquette or compact so formed is later heated to a sintering temperature, but because the metal powder, even when sintered, is rather porous and of low tensile strength, it is customary to provide a reinforcing backing plate of steel, or of copper, or of steel-copper plated, in order to provide a good bond and to prevent embrittling of the core. Conventionally the heat of the sintering step is used both to cause the pressed powder to sinter and to integrally bond it to the backing plate. Where, as in connection with the illustrated embodiment, friction material is to be placed on both sides of a "backing," it is more conventional to refer to the solid metal as the "core."

In accordance with the illustrated embodiment a rotating disc, indicated generally at 10, has a solid metal core, as of steel, and friction facings 12, one on each axial side of the core. At the outer edge the steel core 11 of disc 10 may be formed with equally spaced notches 13, for engagement with lugs associated with a rotatable wheel member (not shown).

Sintered metallic friction materials generally comprise a porous sintered metallic matrix and a filler of substances disposed in the pores of the matrix. I have found that a greatly improved friction composition product, particularly for aircraft brake use, may be made by using a pressed and sintered simple three-component mix comprising a matrix or base as of iron originally finely divided with comparatively coarse graphite and coarse silicon carbide.

A typical composition which may be used for aircraft brake lining is as follows (the percentages of the ingredients being by weight):

| | Percent |
|---|---|
| Iron | 80 |
| Graphite | 10 |
| SiC | 10 |

Nature knows no critical limits and it is difficult, if not impossible, to set limits for desirable ranges for the above proportions since, as will be appreciated by those in the art, exact percentages depend upon so many factors, for example, particle size and even shape of each of the ingredients, density of each of the ingredients, pressures used during compounding, sintering temperatures, ultimate application of the end product particularly with respect to engagement pressure, cooling if any, size, shape and composition of mating surface, size and shape of the friction material, and other factors. However, from many applications, the following ranges have been found suitable:

5 to 15% graphite
  5 to 15% SiC
  Balance substantially all iron.

I have invented or discovered that the graphite should be coarse graphite. By "coarse graphite" I mean one wherein a majority of the material will pass through a 40 mesh screen (Tyler Standard), but will be retained upon a 100 mesh screen. Good results have been obtained with a material having the following screen analysis:

PARTICLE SIZE DISTRIBUTION
*W. S. Tyler screen analysis*

| Mesh Size | Percent Range | Percent Cumulative |
|---|---|---|
| 40 | 4.0 | 4.0 |
| 60 | 56.0 | 60.0 |
| 80 | 21.2 | 81.0 |
| 100 | 4.8-10.4 | 86.0-91.6 |
| 150 | 3.5-3.6 | |
| 200 | 1.5-2.4 | |
| 250 | 0.2-0.5 | |
| 325 | 1.8-2.0 | |
| -325 | 6.0-6.5 | |

With this might be compared the relatively finer grain-size of the finely divided iron powder used in accordance with the invention and where good results are obtained with an average particle size such that 54 percent will pass through a 100 mesh screen, and 10 to 25% through 325 mesh. Or the coarse graphite of the present invention may be compared with ordinary so-called "fine" graphite, heretofore always used for powdered metal articles and which is extremely fine being finer than face powder with an average size such that 80 percent will pass through a 325 mesh screen. I am not sure of the exact theory of operation, but it may be coarser graphite gives a stronger metallic matrix. At any rate, substituting the usual fine graphite for the coarse graphite was found to cause a sharp increase in wear, with a much lower coefficient of friction, and also found to result in increased torque-peak ratio (as hereafter described).

Desirably, the silicon carbide used is coarse so that a majority thereof will go through a 20 mesh screen but will be retained on an 80 mesh screen. Good results have been obtained with a silicon carbide material having the following screen analysis:

PARTICLE SIZE DISTRIBUTION
*W. S. Tyler screen analysis*

| Mesh Size | Percent Range | Percent Cumulative |
|---|---|---|
| 40 | 32.8 | 32.8 |
| 60 | 62.9 | 95.7 |
| 80 | 2.8 | 98.5 |
| 100 | 0 | 98.5 |
| 150 | 0 | 98.5 |
| 200 | 0 | 98.5 |
| 250 | 0 | 98.5 |
| 325 | 0 | 98.5 |
| Pan | 1.5 | 100.0 |

There is, however, a practical limit to the coarseness of any of the materials. For one thing, a facing such as 12 (of Figs. 1 and 2) is normally only .025 to .035" thickness. It has to be kept thin in order to get the heat of frictional engagement into the steel core, and of course, the particle size of any of the ingredients cannot be greater than the maximum thickness of this facing.

As far as processing data is concerned, the powders may be briquetted in a press at a pressure on the order of 15 tons per square inch, then heated to sintering temperature and meanwhile bonded to the core in a furnace under a pressure on the order of 300 pounds per square inch and at a temperature of 1800° F. without any "soak" once this temperature is reached.

It was certainly not immediately apparent that as much as ten percent of silicon carbide would be operative in a combination such as that described, because silicon carbide is such an abrasive, being well up on Mohs' scale, about 9 to 10 and thus one of the hardest known materials outside of diamonds. While I am not exactly sure of the theory of operation, it is my opinion that hardness scale ranges in the hand books are given for room temperature conditions, whereas at the operating temperatures encountered in aircraft brakes silicon carbide, at least, may be much softer.

In any event, I have found that with a composition of the class described many difficulties are solved because an excellent bond is provided between the friction material and the core material, high operating temperatures and energies are adequately withstood, very low wear results both for friction facing and for opposing surface which it engages, and, compared with all prior formulations, there is provided a greatly improved torque-peak quality. Although those in the art are already familiar with such words, it may be here added that a torque-peak is a peak of torque reached at or near the end of a stopping condition, generally right at the point of complete stopping. In the testing of brakes there is an applied pressure (which in the case of an automobile may be thought of as pedal pressure) and there is usually another measured pressure which represents the pressure caused by friction engagement and is often called "torque" or pressure developed. All this may be expressed by formula as follows:

Where,
  $U$=Coefficient of friction
  $T$=Torque
  $P_a$=Pressure applied (usually held constant)
  $A$=Area of each friction facing
  $N$=Number of friction facings
  $K$=a constant
  $P_m$=Pressure developed and measured.

Then, $$U = \frac{T}{P_a \times A \times N} = \frac{K \times P_m}{P_a \times A \times N}$$

With arrangements according to the invention it has been found that there is not only improved torque-peak quality, but also less torque fading, and many other advantages already referred to.

There is thus provided arrangements of the character described capable of meeting the objects above set forth.

While I have described and illustrated a particular embodiment, various modifications may obviously be made without departing from the true spirit and scope of the invention which is intended to be defined by the appended claims and their reasonable equivalents.

I claim:

1. A friction composition product for aircraft brakes and consisting of a pressed and sintered mixture of about 10% by weight of divided graphite, of coarseness such that at least 80% will pass through a 40 mesh screen and remain on a 100 mesh screen, about 10% by weight of silicon carbide, of coarseness such that at least 95% remains on a 100 mesh screen, and the balance iron powder.

2. A friction composition product for aircraft brakes and consisting of a pressed and sintered mixture of about 10% by weight of divided graphite of fineness such that a majority of the material will pass through a 40 mesh screen and of coarseness such that a majority of the material remains on a 100 mesh screen, about 10% by weight of silicon carbide, and the balance iron powder.

3. A friction composition product for extreme heavy duty and consisting of a pressed and sintered mixture of 5 to 15 percent graphite particles of fineness such that a majority of the material will pass through a 40 mesh screen and of coarseness such that a majority of the material remains on a 100 mesh screen, 5 to 15 percent silicon carbide in the form of particles, and the balance iron powder of a fineness such that not less than 10% thereof will pass through a 325 mesh screen.

References Cited in the file of this patent

UNITED STATES PATENTS

| | | |
|---|---|---|
| 2,072,070 | Fisher | Feb. 23, 1937 |
| 2,784,105 | Stedman et al. | Mar. 5, 1957 |